United States Patent
Chang

(10) Patent No.: US 7,213,689 B2
(45) Date of Patent: May 8, 2007

(54) SHOCK ABSORBER FOR A REMOTE-CONTROLLED MODEL CAR

(75) Inventor: Lien-Sheng Chang, Taichung Shien (TW)

(73) Assignee: Golden Lion Enterprise Co., Ltd., Taichung Shien (TW)

( * ) Notice: Subject to any disclaimer, the term of this patent is extended or adjusted under 35 U.S.C. 154(b) by 181 days.

(21) Appl. No.: 11/123,026

(22) Filed: May 6, 2005

(65) Prior Publication Data

US 2006/0249341 A1 Nov. 9, 2006

(51) Int. Cl.
*F16F 9/50* (2006.01)

(52) U.S. Cl. .............................. 188/282.6; 188/322.15; 188/280

(58) Field of Classification Search ............. 188/282.5, 188/282.6, 322.15, 322.22, 280
See application file for complete search history.

(56) References Cited

U.S. PATENT DOCUMENTS

| | | | | |
|---|---|---|---|---|
| 2,310,570 A | * | 2/1943 | Briggs | 188/276 |
| 3,831,626 A | * | 8/1974 | Peddinghaus | 137/493.8 |
| 3,984,889 A | * | 10/1976 | Blomgren | 14/71.7 |
| 4,372,545 A | * | 2/1983 | Federspiel | 267/221 |
| 4,765,445 A | * | 8/1988 | Komossa et al. | 188/266.2 |
| 4,809,828 A | * | 3/1989 | Nakazato | 188/282.6 |
| 4,961,482 A | * | 10/1990 | Pohlenz et al. | 188/280 |
| 5,078,241 A | * | 1/1992 | Ackermann et al. | 188/282.6 |
| 5,529,154 A | * | 6/1996 | Tanaka | 188/282.6 |
| 6,116,388 A | * | 9/2000 | Bataille et al. | 188/282.6 |
| 7,040,468 B2 | * | 5/2006 | Shinata | 188/322.15 |

\* cited by examiner

*Primary Examiner*—Robert A. Siconolfi
(74) *Attorney, Agent, or Firm*—Troxell Law Office, PLLC

(57) ABSTRACT

A shock absorber for a remote-controlled model car includes a sealing member fixed on the topside of a piston. The sealing member has two opposite flexible portions respectively matching with the flow-guiding holes of the piston, with flow gaps formed between the flexible portions and the upper outer sides of the piston. The flow gap, matching with the extent of an external force imposed upon the shock absorber, can be properly diminished or closed up. Each flexible portion is bored with a flow-adjusting hole smaller than and aligned to the flow-guiding hole of the piston for reducing the flow amount of liquid oil flowing through the flow-guiding hole. When pressed by different-extent external forces, the shock absorber can automatically adjust its buffering force to an excellent condition by adjustment of the flow-adjusting holes and the flow gaps.

6 Claims, 9 Drawing Sheets

SHOCK ABSORBER FOR A REMOTE-CONTROLLED MODEL CAR

BACKGROUND OF THE INVENTION

1. Field of the Invention

This invention relates to a shock absorber for a remote-controlled model car, particularly to one able to automatically adjust its buffering force to an excellent condition for matching with different-extent external forces, having an excellent effect in buffering and shock absorption.

2. Description of the Prior Art

A conventional shock absorber for a remote-controlled model car includes a hydraulic cylinder 10 and a spring member 20. The hydraulic cylinder 10 consists of a cylinder 11 and a piston rod 12. The cylinder 11 has its interior filled with liquid oil and the rod body 121 of the piston rod 12 has its upper end connected with a piston 123 with two flow-guiding holes 122 to be clogged in the interior of the cylinder 11. The spring member 20 is positioned between the upper spring holder 111 of the cylinder 11 and the lower spring holder 124 at the lower end of the piston rod 12. Thus, when the remote-controlled model car runs on an uneven road and sways up and down, the shock absorber of the remote-controlled model car will be actuated by an external force to make the cylinder 11 and the piston rod 12 push each other. At this time liquid oil in the cylinder 11 over the piston 123 will be compressed to flow to the cylinder 11 under the piston 123 through the two flow-guiding holes 122 of the piston 123, thus producing oil-buffering effect. The piston rod 12 is able to recover its original position by the resilience of the spring member 20.

However, the flow-guiding holes 122 of the piston 123 of a conventional shock absorber are fixed in size; therefore, the buffering force produced by the conventional shock absorber cannot be altered. In other words, the conventional shock absorber cannot automatically adjust its buffering force to a most appropriate condition in accordance with the condition of an uneven road or the extent of swaying. As a result, the shock absorber fails to produce a marked shock absorbing effect, or the buffering force produced is insufficient, likely to let the remote-controlled model car jump and sway up and down violently or collide with the ground and get damaged.

SUMMARY OF THE INVENTION

The objective of the invention is to offer a shock absorber for a remote-controlled model car shock, which has a sealing member fixed on the upper outer side of the piston of a piston rod. The sealing member has its opposite sides respectively formed with a flexible portion aligned to the flow-guiding hole of the piston, with a flow gap formed between the flexible portion of the sealing member and the upper outer side of the piston. The flow gap, matching with the extent of an external force imposed upon the shock absorber, can be properly diminished or closed up. The two flexible portions of the sealing member are respectively bored with a flow-adjusting hole smaller than and aligned to the flow-guiding hole of the piston for reducing the flow amount of liquid oil flowing toward the flow-guiding hole. When pressed by external force of different extents, the shock absorber can automatically adjust its buffering force to a most appropriate condition by adjustment of the position of the flow-adjusting holes and the size of the flow gaps.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
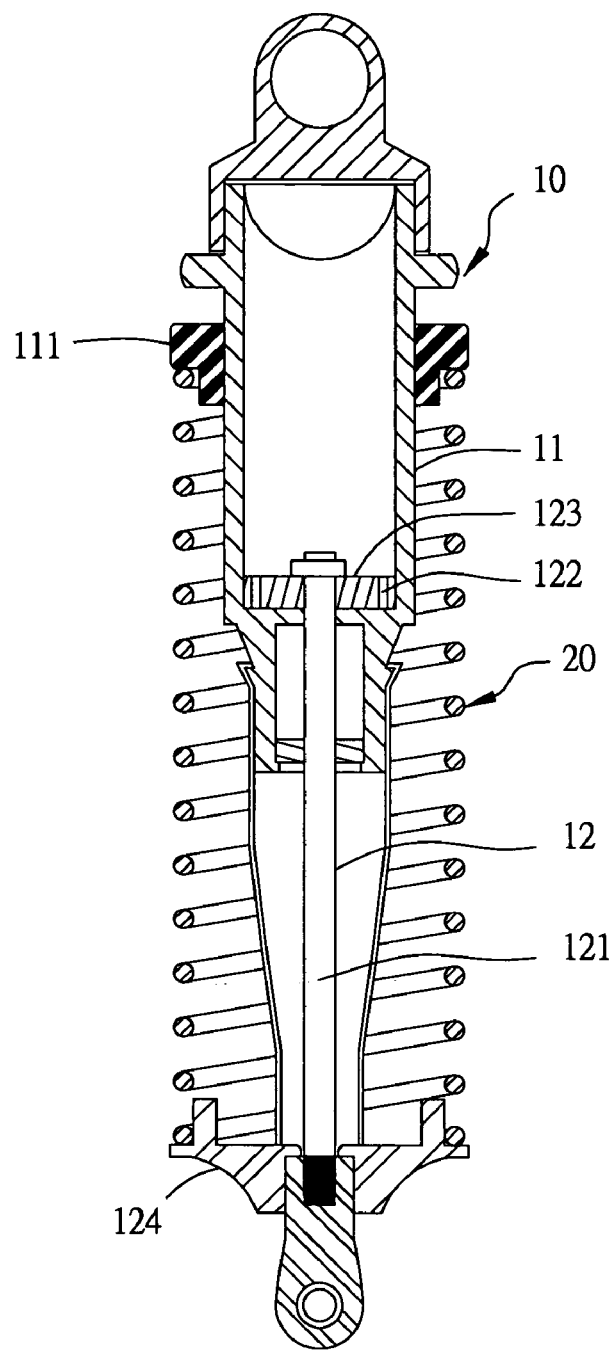
FIG. 1 is a side cross-sectional view of a convention shock absorber for a remote-controlled model car.
Figure 2:
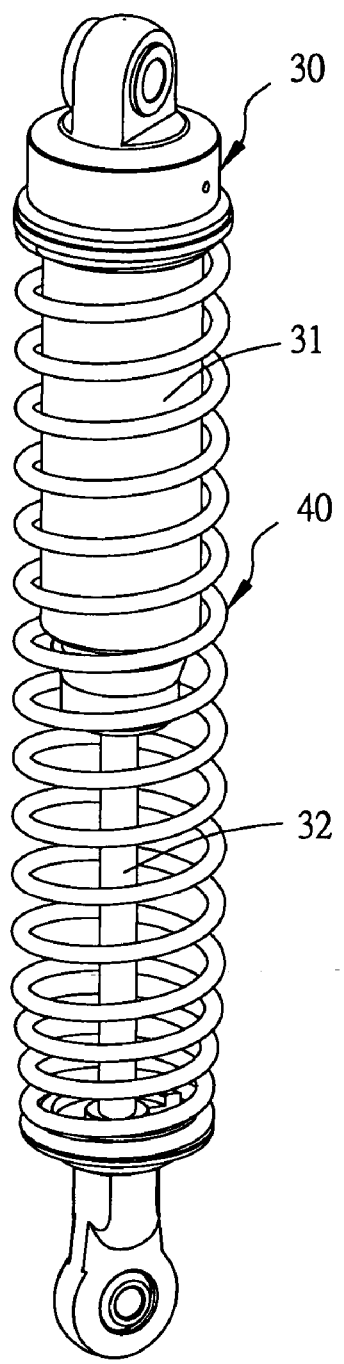
FIG. 2 is a perspective view of a shock absorber for a remote-controlled model car in the present invention.
Figure 3:
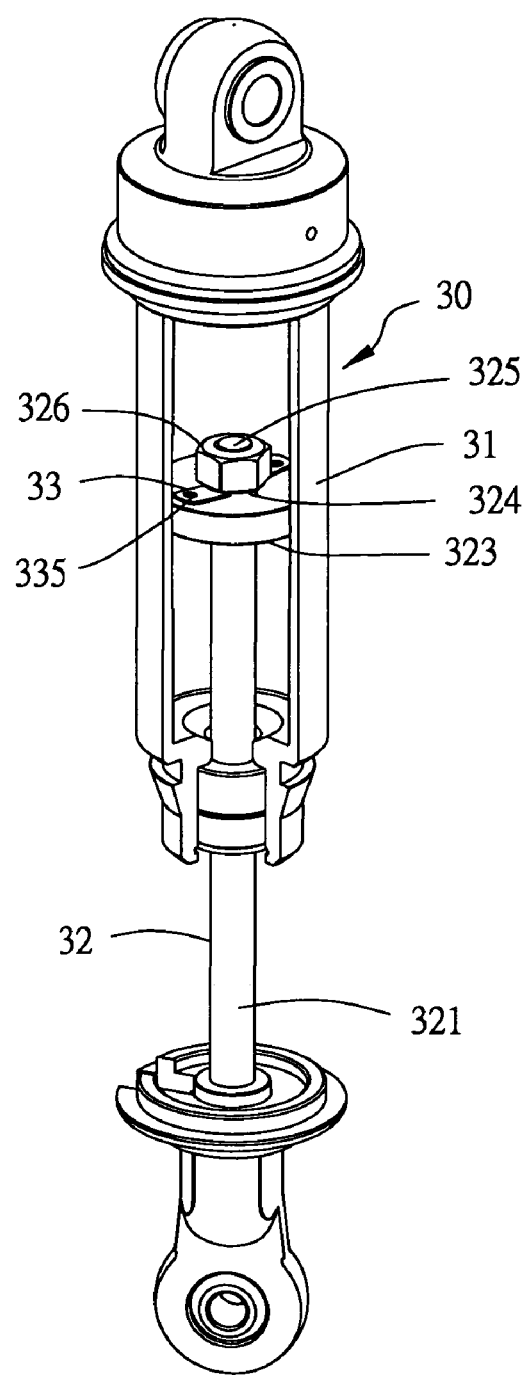
FIG. 3 is a partial perspective and cross-sectional view of the shock absorber for a remote-controlled model car in the present invention.
Figure 4:
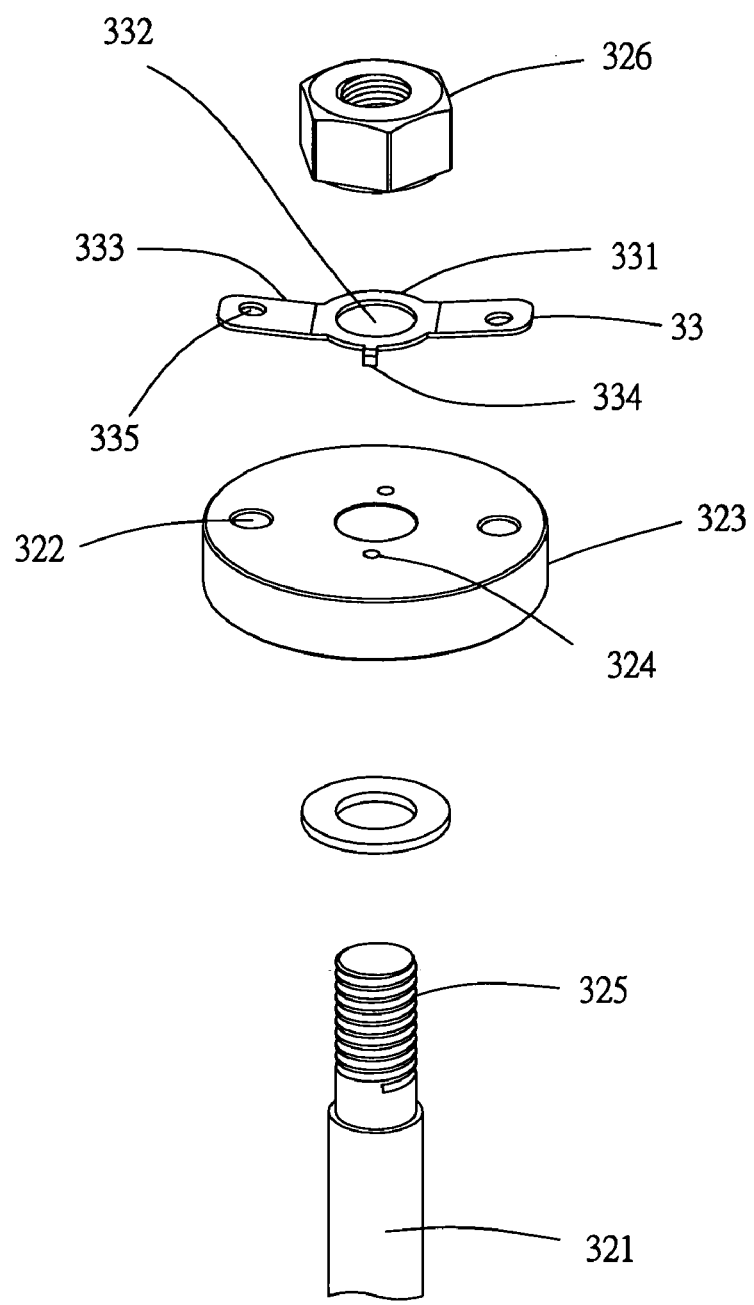
FIG. 4 is a partial exploded perspective view of the shock absorber for a remote-controlled model car in the present invention.

A preferred embodiment of a shock absorber for a remote-controlled model car in the present invention, as shown in FIGS. 2, 3 and 4, includes a hydraulic cylinder 30 and a spring member 40 as main components combined together.

The hydraulic cylinder 30 consists of a cylinder 31 and a piston rod 32 that has the upper end of its rod body 321 connected with a piston 323 with two flow-guiding holes 322.

The spring member 40 is positioned between the cylinder 31 and the piston rod 32.

The piston 323 is bored with two symmetrical positioning holes 324 at proper locations of the opposite upper sides.

Figure 5:
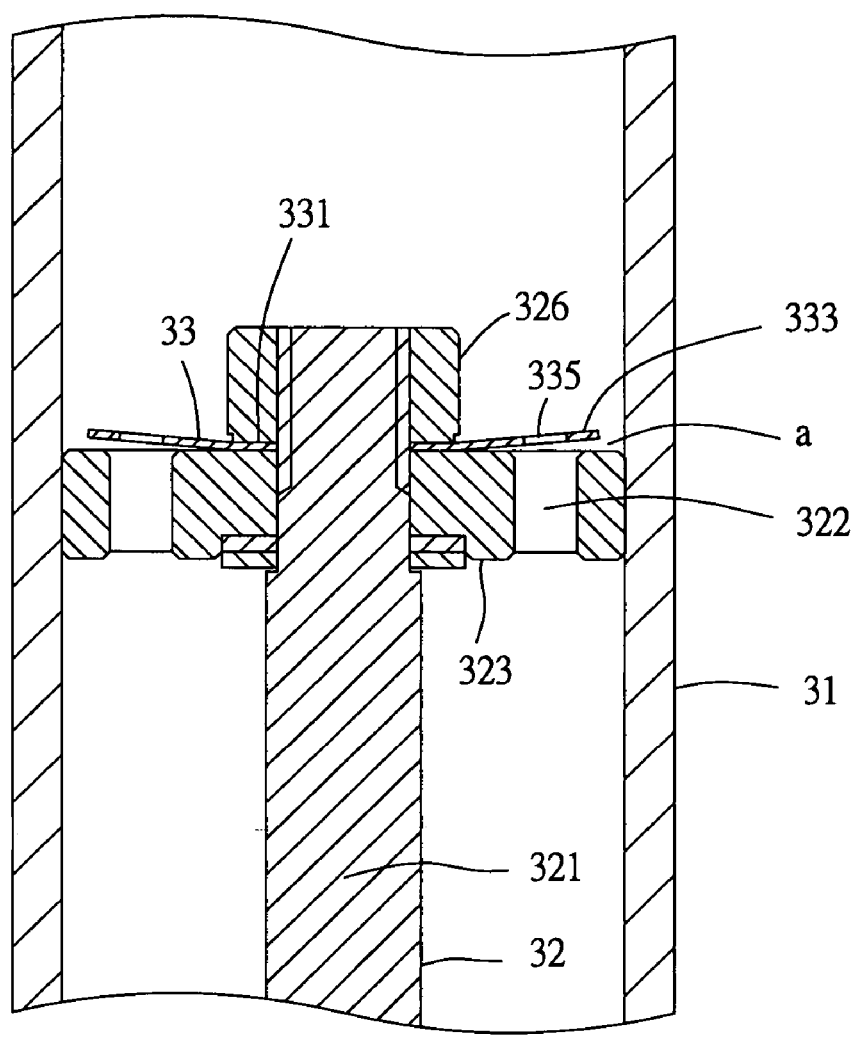
FIG. 5 is a partial side cross-sectional view of a combining condition of a piston and a sealing member in the present invention.

A sealing member 33 shaped as an elongate strip, as shown in FIG. 5, has its intermediate portion formed with a circular portion 331 bored with an insert hole 332 in the center to be fitted on the upper end of the rod body 321 of the piston rod 32. The circular portion 331 of the sealing member 33 is locked in position by a nut 326 screwed with a bolt portion 325 at the upper end of the rod body 321. Further, the circular portion 331 of the sealing member 33 has its opposite sides respectively extending outward obliquely and forming a flexible portion 333 able to be distorted and moved downward elastically. The two flexible portions 333 of the sealing member 33 are normally in a slightly upturned and curved condition and are respectively positioned over the two flow-guiding holes 322 of the piston 323, with flow gaps (a) formed between the flexible portions 333 and the upper outer side of the piston 323. When the upper sides of the two flexible portions 333 of the sealing member 33 are pressed and distorted to move downward, the flow gaps (a) will diminish, and when the two flexible portions 333 flatly and closely contact with the upper outer side of the piston 323, the flow gap (a) will be closed up. The two flexible portions 333 of the sealing member 33 can automatically recover their original positions by their own flexibility when pressure on the upper sides of the two flexible portions 333 vanishes.

Figure 6:
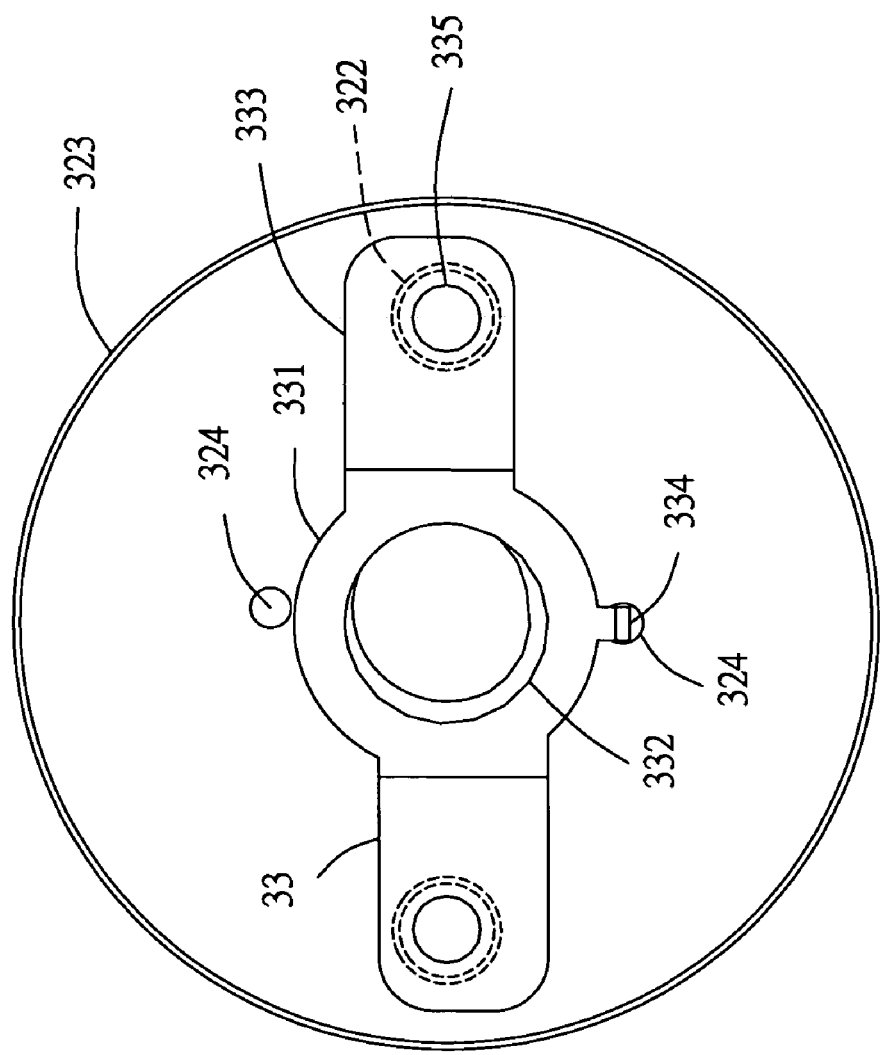
FIG. 6 is an upper view of the sealing member assembled at a standard position on the piston in the present invention.
Figure 7:
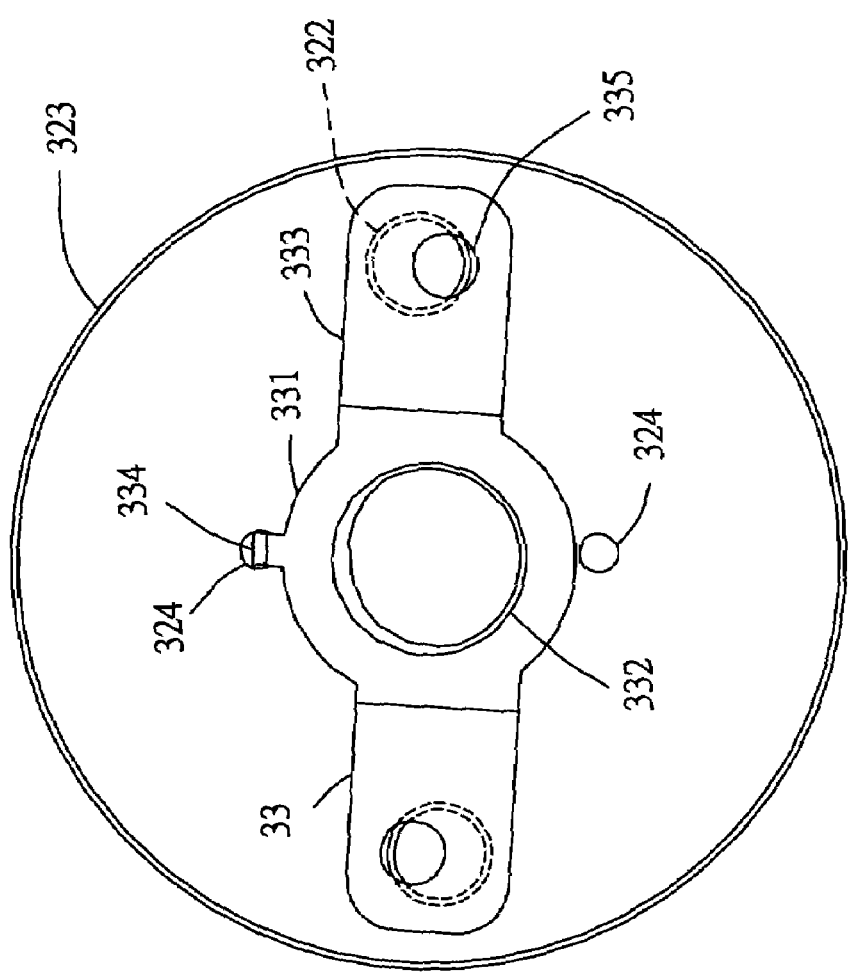
FIG. 7 is an upper view of the sealing member assembled at a deflecting position on the piston in the present invention.

In addition, the circular portion 331 of the sealing member 33 is fixed with a positioning stud 334 extending downward from a proper location to be inserted in either of the two positioning holes 324 of the piston 323 for positioning the sealing member 33 before the sealing member 33 is locked in position by the nut 326. The two flexible portions 333 of the sealing member 33 are respectively bored at a proper location with a flow-adjusting hole 335 aligned to the flow-guiding hole 322 of the piston 323 and having a diameter a little smaller than that of the flow-guiding hole 322. When the sealing member 33 is mounted at a standard position, that is, when the positioning stud 334 of the sealing member 33 is inserted in one positioning hole 324 of the piston 323, the flow-adjusting holes 335 of the opposite flexible portions 333 of the sealing member 33 can be respectively and completely positioned within the flow-guiding holes 322 of the piston 323, as shown in FIG. 6. Thus, the flow amount of liquid oil can be restricted by the flow-adjusting holes 335. When the sealing member 33 is mounted at a deflecting position, that is, when the positioning stud 334 of the sealing member 33 is inserted in the other positioning hole 324 of the piston 323, the flow-adjusting holes 335 of the opposite flexible portions 333 and the flow-guiding holes 322 of the piston 323 will deflect relatively, as shown in FIG. 7. Thus, only a part of the flow-adjusting hole 335 is positioned within the flow-guiding hole 322; therefore, the flow amount of hydraulic oil can be restricted only by a comparatively small hole formed by the overlapping portion of the flow-adjusting hole 335 and the flow-guiding hole 322.

If the sealing member 33 is assembled at a standard position on the piston 323, the function of the shock absorber of this invention is described below.

Figure 8:
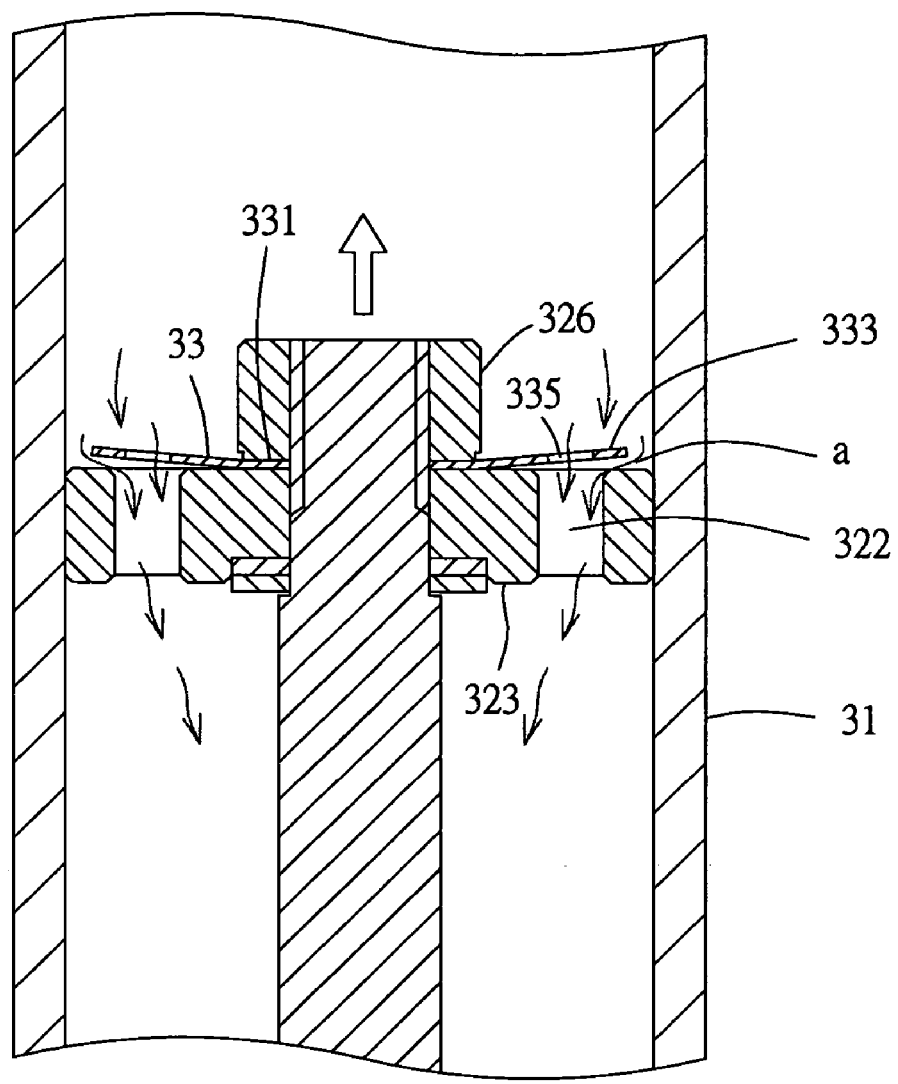
FIG. 8 is a partial cross-sectional view of the shock absorber in the present invention, showing the position of the sealing member and the flowing condition of liquid oil when the shock absorber bears a comparatively small external force.

Referring to FIG. 8, when a remote-controlled car runs on an even road, external force imposed upon the shock absorber is comparatively small. Under this condition, even though the piston 323 of the piston rod 32 is moved upward to push and compress the liquid oil in the upper interior of the cylinder 31, the strength of the liquid oil compressed is insufficient to make the two flexible portions 333 of the sealing member 33 distorted and shifted downward. Therefore, comparatively large flow gaps (a) are still maintained between the flexible portions 333 and the upper outer sides of the piston 323. Thus, liquid oil in the upper interior of the cylinder 31 can flow to the lower interior of the cylinder 31 through the flow gaps (a) and the flow-adjusting holes 335 within the flow-guiding holes 322. Under the circumstances, the total flow amount of liquid oil increases and the resistance to the piston 323 shifting in the interior of the cylinder 31 decreases, thus producing a comparatively weak buffering force to let the remote-controlled model car have an excellent shock absorbing effect when it runs on an even road.

Figure 9:
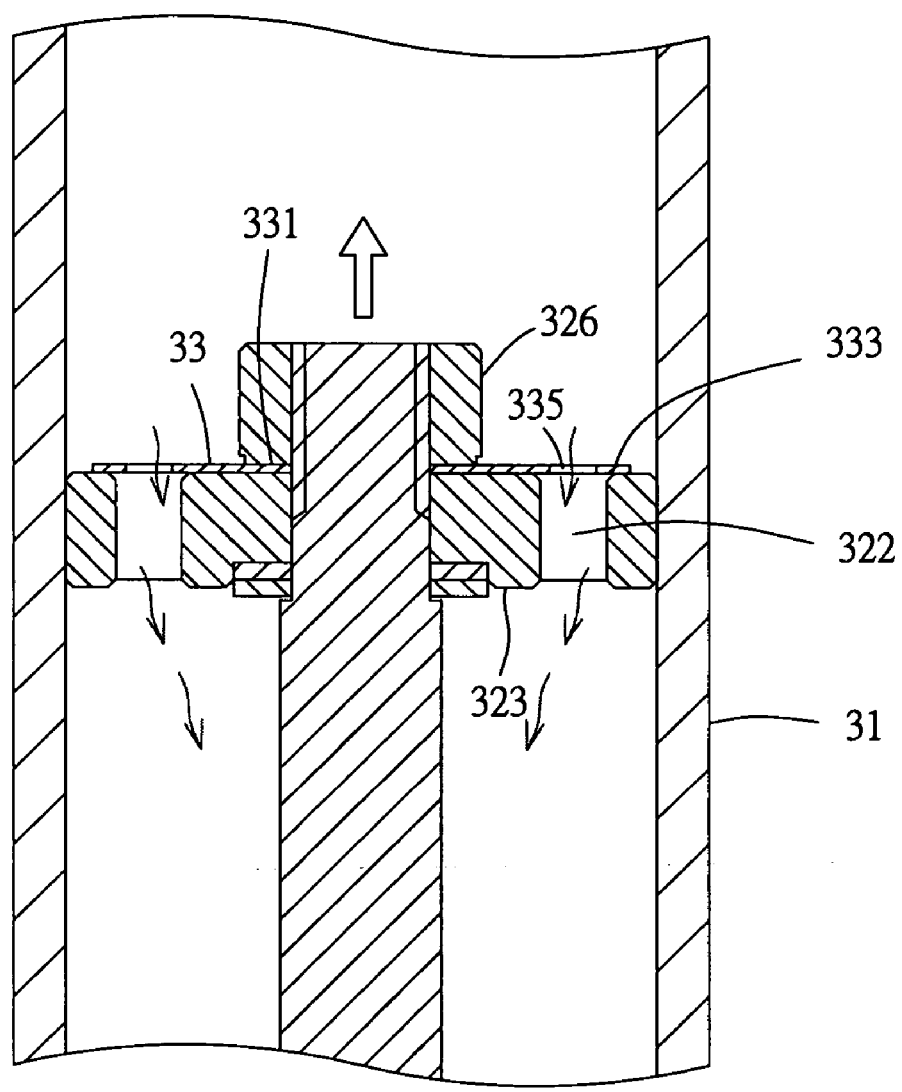
FIG. 9 is a partial cross-sectional view of the shock absorber in the present invention, showing the position of the sealing member and the flowing condition of hydraulic oil when the shock absorber bears a comparatively large external force.

Referring to FIG. 9, when a remote-controlled model car runs on an uneven road, external force imposed upon the shock absorber is comparatively large. Therefore, when the piston 323 of the piston rod 32 is moved upward to push and compress the hydraulic oil in the upper interior of the cylinder 31, the strength of the hydraulic oil compressed is large enough to make the two flexible portions 333 of the sealing member 33 distorted and shifted downward to a certain extent according to the extent of an external force and diminish or close up the flow gaps (a). At this time, the hydraulic oil in the upper interior of the cylinder 31 flows to the lower interior of the cylinder 31 only through the flow-adjusting holes 335 overlapping the flow-guiding holes 322, or through the comparatively small flow gaps (a) and the flow-adjusting holes 335 overlapping the flow-guiding holes 322. Since the flow-adjusting holes 335 are smaller than the flow-guiding holes 322 in size, the total flow amount of liquid oil decreases and resistance to the piston 323 shifting in the interior of the cylinder 31 increases, thus producing a comparatively strong buffering force able to prevent the remote-controlled model car from jumping and swaying up and down violently and getting damaged due to collision with the ground when it runs on an uneven road.

Evidently, the shock absorber for a remote-controlled model car in the present invention can automatically adjust the extent of its buffering force in accordance with the condition of a road so as to keep the remote-controlled model car in an excellent buffering and shock absorbing condition, enabling a remote-controlled model car to run steadily, avoiding damage caused by collision with the ground and prolonging service life of the remote-controlled model car.

Additionally, the sealing member 33 of the shock absorber of this invention can be installed either at a standard position or at a deflecting position in accordance with discrepancy of remote-controlled model cars or that of road conditions. If the sealing member 33 is installed at a standard position on the piston 323, its flow-adjusting holes 335 are completely positioned within the flow-guiding holes 322 of the piston 323. Therefore, when the sealing member 33 flatly and closely contacts with the upper outer sides of the piston 323, the flow-adjusting holes 335 of the sealing member 33 are the only passageways for liquid oil to flow therethrough. When the sealing member 33 is installed at a deflecting position on the piston 323, only parts of the flow-adjusting holes 335 of the sealing member 33 are positioned within the flow-guiding holes 322 of the piston 323. Therefore, when the sealing member 33 flatly and closely contacts with the upper outer sides of the piston 323, liquid oil can only flow through parts of the flow-adjusting holes 325, which overlap the flow-guiding holes 322. As a result, the flow amount of liquid oil is comparatively small and the buffering force produced is comparatively weak.

While the preferred embodiment of the invention has been described above, it will be recognized and understood that various modifications may be made therein and the appended claims are intended to cover all such modifications that may fall within the spirit and scope of the invention.

I claim:

1. A shock absorber for a remote-controlled model car comprising a hydraulic cylinder and a spring member, said hydraulic cylinder having a cylinder and a piston rod, said cylinder having its interior filled with hydraulic oil, said piston rod having one end of its rod body connected with a piston with flow-guiding holes, said piston clogged in the interior of said cylinder, said spring member fitted between said cylinder and said piston rod, said spring member enabling said piston rod to recover their original position: and, Characterized by a sealing member fixed on a preset portion of the topside of said piston of said piston rod, said sealing member formed with at least one flexible portion positioned over said flow-guiding hole of said piston, said flexible portion of said sealing member slightly turning upward, a flow gap formed between said flexible portion of said sealing member and the upper outer side of said piston, said flexible portion bored with a flow-adjusting hole aligned to said flow-guiding hole of said piston, said flow-adjusting hole smaller in size than said flow-guiding hole, said flexible portion of said sealing member distorted and shifted toward the topside of said piston to diminish or close up said flow gaps when said flexible members are properly compressed by the hydraulic pressure, the flow amount of liquid oil flowing through said flow-guiding holes of said piston can be controlled by adjusting the positions of said sealing member, said shock absorber able to automatically adjust its buffering force to an excellent condition according to different extents of external forces.

2. A shock absorber for a remote-controlled model car as claimed in claim 1, wherein said piston is bored with two symmetrical flow-guiding holes, and said sealing member has its opposite ends respectively bored with a flow-adjusting hole aligned to said flow-guiding hole of said piston.

3. A shock absorber for a remote-controlled model car as claimed in claim 1, wherein said sealing member is formed with a circular portion at a preset location, said circular portion bored with an insert hole in the center to be fitted on the upper end of said rod body of said piston rod, said circular portion of said sealing member locked in position by a nut screwed with the upper bolt portion of said rod body, said flexible portions of sealing member respectively extending outward obliquely from the opposite sides of said circular portion.

4. A shock absorber for a remote-controlled model car as claimed in claim 1, wherein said flow-adjusting hole of said sealing member is completely positioned within said flow-guiding hole of said piston.

5. A shock absorber for a remote-controlled model car as claimed in claim 1, wherein said flow-adjusting hole of said sealing member has only a part positioned within said flow-guiding hole of said piston.

6. A shock absorber for a remote-controlled model car as claimed in claim 1, wherein said sealing member is provided with a positioning stud extending downward from a preset portion and said piston has its opposite outer sides respectively bored with a positioning hole in a preset portion for said positioning stud of said sealing member to be optionally inserted therein, said flow-adjusting holes of said sealing member completely positioned within said flow-guiding holes of said piston when said positioning stud of said sealing member is inserted in one said positioning hole of said piston, said flow-adjusting holes having only a part positioned within said flow-guiding holes when said positioning stud is inserted in the other said positioning hole of said piston.

* * * * *